United States Patent [19]
Bressoud et al.

[11] Patent Number: 5,802,265
[45] Date of Patent: Sep. 1, 1998

[54] TRANSPARENT FAULT TOLERANT COMPUTER SYSTEM

[75] Inventors: Thomas C. Bressoud, Northborough; John E. Ahern, Sudbury, both of Mass.; Kenneth P. Birman, Ithaca, N.Y.; Robert C. B. Cooper, Wellesley; Bradford B. Glade, Harvard, both of Mass.; Fred B. Schneider, Ithaca, N.Y.; John D. Service, Chelmsford, Mass.

[73] Assignee: Stratus Computer, Inc., Marlboro, Mass.

[21] Appl. No.: 565,145

[22] Filed: Dec. 1, 1995

[51] Int. Cl.$^6$ .................................................. G06F 11/34
[52] U.S. Cl. ................................. 395/182.09; 395/182.11
[58] Field of Search ................................. 395/180, 181, 395/182.01, 182.08, 182.09, 182.1, 182.11; 364/228.8, 228.9

[56] References Cited

U.S. PATENT DOCUMENTS

| | | | |
|---|---|---|---|
| 4,590,554 | 5/1986 | Glazer et al. | 395/182.08 |
| 4,608,688 | 8/1986 | Hansen et al. | 395/182.08 |
| 4,965,717 | 10/1990 | Cutts, Jr. et al. | 395/182.08 |
| 5,157,663 | 10/1992 | Major et al. | 395/182.09 |
| 5,193,180 | 3/1993 | Hastings . | |
| 5,295,258 | 3/1994 | Jewett et al. | 395/182.08 |
| 5,335,344 | 8/1994 | Hastings | 395/183.14 |
| 5,363,503 | 11/1994 | Gleeson | 395/182.08 |
| 5,423,037 | 6/1995 | Hnasshoud | 371/8.1 |
| 5,440,727 | 8/1995 | Bhide et al. | 395/444 |
| 5,555,404 | 9/1996 | Torbjornsen et al. | 395/182.08 |
| 5,590,277 | 12/1996 | Fuchs et al. | 395/183.14 |
| 5,621,885 | 4/1997 | Del Vigna, Jr. | 395/182.11 |

OTHER PUBLICATIONS

Mellor–Crummey, J.M. et al., "A Software Instruction Counter", 1989, Association for Computing Machinery, pp. 78–86.
Siewiorek, D.P. et al, editors, "Design Methodology", *Reliable Computer Systems—Design and Evaluation*, Chap. 11, 1992.
Siewiorek, D.P. et al, editors, "The Stratus Case", *Reliable Computer Systems—Design and Evaluation*, Chap. 8, 1992.
Birman, Kenneth P., "The Process Group Approach to Reliable Distributed Computing", Dec. 1993, vol. 36, No. 12, pp. 37–53.
Wensley, J.H. et al., "SIFT: Design and Analysis of a Fault–Tol. Computer for Aircraft Control", 66(11):1240–55, Oct. 1978.
Bartlett, Joel F., "A NonStop Kernel", *Proceedings of the 8th ACM Symposium on Operating Systems Principles*, Dec. 1981.
Borg, A. et al., "Fault Tolerance Under UNIX", *ACM Transactions on Computer Systems*, 7(1), Feb. 1989, pp. 1–24.
Elnozahy, E.N., An Efficient Technique for Tracking Non-deterministic . . . , National Science Foundation, 1995.

*Primary Examiner*—Albert Decady
*Attorney, Agent, or Firm*—Cesari and McKenna, LLP

[57] ABSTRACT

In a fault-tolerant computer system, a primary replica supervisor is interposed between an operating system and a primary replica of an application program being executed by a primary processor. An object-code editor locates calls to the operating system and loops in the application program and inserts instruction sequences that enable the replica supervisor to intercept the calls to the operating system, results returned by the operating system as a result of the calls and asynchronous events delivered by the operating system to the replica. A backup replica supervisor is similarly interposed between an operating system and a backup replica of the application program being executed by a backup processor. The primary replica interacts with an environment. The replica supervisors ensure that the backup replica undergoes state transformations, as a result of the calls to the operating system and asynchronous events, that are equivalent to state transformations that the primary replica undergoes as a result of corresponding calls and asynchronous events. Thus, after a failure in the primary processor, the backup replica can interact with the environment in a manner consistent with interactions between the primary replica and the environment prior to the failure.

4 Claims, 7 Drawing Sheets

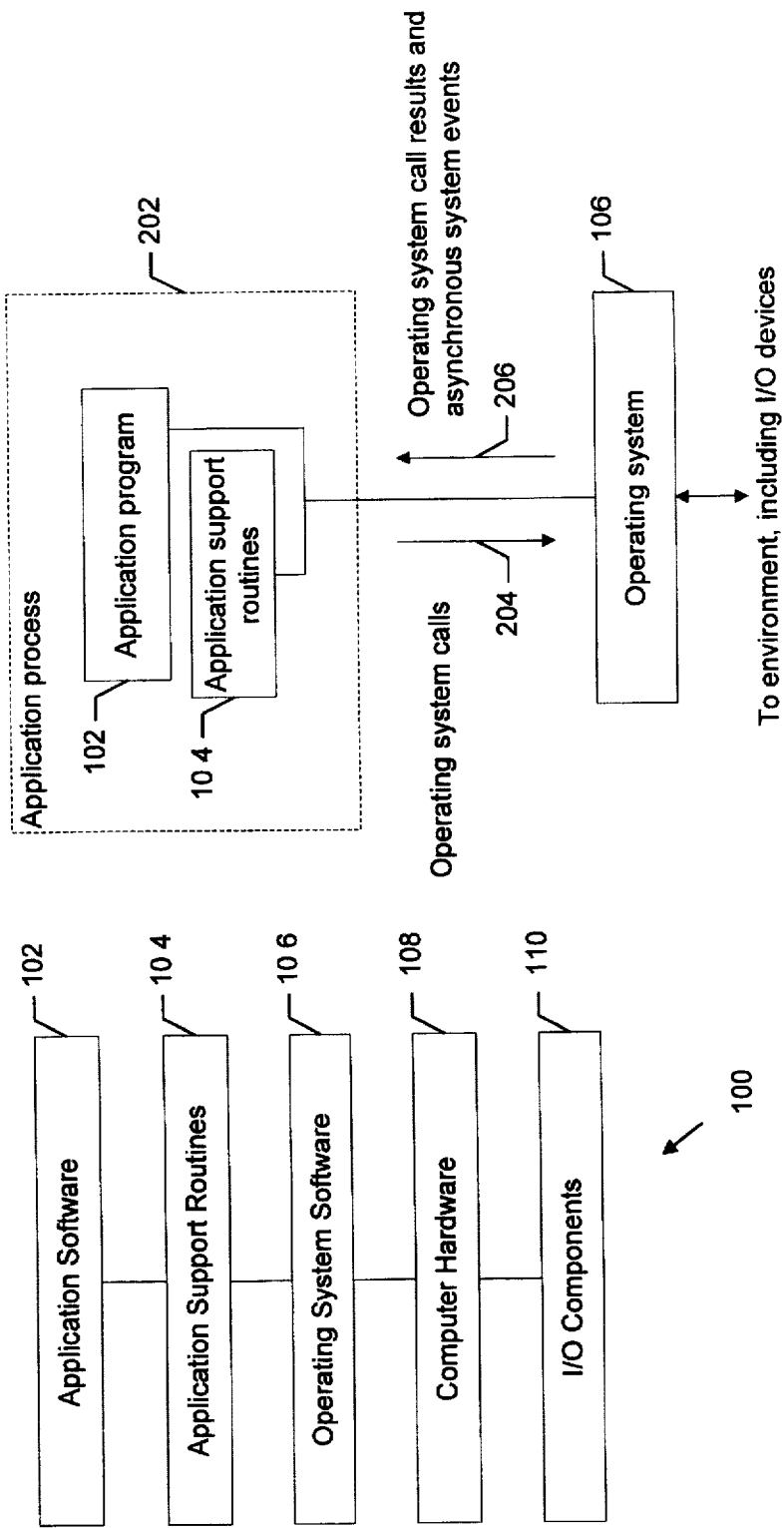

TRANSPARENT FAULT TOLERANT COMPUTER SYSTEM

BACKGROUND OF THE INVENTION

1. Field of the Invention

The invention relates to fault-tolerant computer systems and, in particular, to replica coordinators for such fault-tolerant systems.

2. Description of the Related Art

A need exists for "fault-tolerant" computer systems that can continue to operate despite a failure of one of their components. Examples include inter-bank electronic funds-transfer systems and airline flight reservation systems. To achieve fault-tolerance, these systems typically employ redundancy in the components that are likely to fail, i.e., they employ "replicas" and replace a failed component with a non-faulty replica ("spare"). These systems coordinate the replicas so all replicas are in the same state and, therefore, the spare is able to take over for the failed component. Coordinating these replicas poses a key problem in the design of a fault-tolerant system.

One approach to replica coordination, known as the "state machine approach," calls for each replica to be a deterministic state machine that reads a sequence of commands, each command causing a state transition that is completely determined by the command and the current state of the machine. The state transitions can produce outputs to an environment, e.g. I/O requests. Each replica of the state machine starts in the same state and reads an identical sequence of commands. Each replica, therefore, undergoes an identical sequence of state transitions and produces an identical sequence of outputs. This approach ensures that, when a failure occurs, the spare is in the same state as the failed component at the time of, or just prior to, the failure. The spare can therefore interact with the environment in a manner consistent with past interactions between the now-failed component and the environment.

Fault-tolerant systems mask replica failures by combining the output sequences from multiple replicas into a single output sequence that appears to have come from a single, non-faulty state machine. According to this approach, each replica produces a sequence of outputs, but a replica coordination mechanism allows only one replica's sequence of outputs to reach the environment. For example, accepting outputs from 2t+1 replicas, a "majority voter" can selectively provide the outputs to the environment and thereby mask as many as t faulty replicas. In a "primary/backup" method of replica coordination, all non-faulty replicas perform the same computations, but only one replica (the primary) interacts with the environment. In either case the fault-tolerant system must ensure that each replica reads the same sequence of commands and the environment receives only a single output.

A computer system is composed of layers, as shown in FIG. 1. An Application program makes calls to application support routines (DLLs, RTLs, etc.), which in turn call operating system software. Optionally, the application software can bypass the support routines and call the operating system directly. Lower layers include computer hardware (CPU, memory, bus, network, etc.), and I/O components (disks, user terminals, etc.)

Prior-art systems provide replica coordination by adding a layer or significantly modifying one or more of the existing layers. Each such approach poses problems, however. For example, in hardware-layer replica coordination, the CPU, memory, operating system and application are replicated and the hardware chooses which replica interacts with the environment. This requires no changes to the operating system or application software, but, quite problematically, each new hardware realization requires a separate design and consequentially these systems lag behind the hardware cost/performance curve.

Adding replica coordination to an existing operating system is difficult because a developer must identify state transitions implemented in the operating system. This is difficult because mature operating systems are very complex. Furthermore, modifying an operating system and then maintaining the modified operating system is very costly. Some prior-art systems provide an additional application support layer between the application and the operating system. Problematically, this requires application developers to learn and use a new interface. Furthermore existing applications must be rewritten to be made fault-tolerant. Fault-tolerance can also be built into an application. However, this shifts the problem of replica coordination to the application's developers and the same problems must be solved anew for each application. Furthermore, application developers generally are not acquainted with the complexity and nuances of replica coordination.

Some prior-art systems, such as a so-called "hypervisor" system, impose a heavy performance penalty due to a high frequency with which the replica coordinator must be invoked.

SUMMARY OF THE INVENTION

The invention provides "transparent fault-tolerance" by interposing a new layer (a "replica supervisor") between the application/application support layers (hereinafter the "application") and the operating system layer without altering the operating system interface, as viewed by the application. Transparent fault-tolerance means that application developers need not be aware of the replica supervisor when writing an application and an existing application can be made fault-tolerant without a developer rewriting the application. An additional processor and operating system executes and provides services to, respectively, each replica of the application. Advantageously, interposing the replica supervisor above the operating system enables the system to tolerate hardware faults and faults in the operating system that occur independently on the different processors, such as faults induced by other, possibly unrelated, applications. The operating system can replaced, e.g. with a newer version, on one processor at a time. If more than two processors are provided, continuous fault-tolerance is provided.

The replica supervisors intercept calls to the operating system made by the replicas and asynchronous events delivered by the operating system to the replicas. The replica supervisors communicate with each other to coordinate the multiple replicas and ensure that only one replica, a "primary replica" being executed on a "primary processor," interacts with the environment. The replica supervisors also ensure that a "backup replica" receives the same inputs, and thus undergoes the same state transitions, as the primary replica. The replica supervisor being executed by the primary processor is known as a "primary supervisor," while the other replica supervisor is a "backup supervisor." For simplicity, we describe a system comprising one backup processor, but the invention can easily be extended to multiple backup processors.

We define "application state" to include attributes of a replica that are saved and restored during a process context switch. These attributes include, but are not limited to, the contents of registers and memory and operating system-maintained quantities, e.g. a scheduling wait-state resulting from an I/O request. Events that can change (produce a "transformation" of) a replica's application state include the replica executing instructions, calling the operating system, and receiving notification of an asynchronous event from the operating system. These asynchronous events include exceptions resulting from executing an instruction, e.g. dividing by zero, and completion of operations previously requested by the replica, e.g. disk I/O completion.

Corresponding events in different replicas can produce different transformations of the respective replica's application state. For example, calling the operating system to create a scratch file can result in different file names being returned to the respective replicas. The replica supervisors intercept events that can cause different transformations of the respective replica's application state.

The replica supervisors provide interfaces to the replicas that are the same as the interface provided by the operating system. Thus, when one of the replicas makes a call to the operating system, the corresponding replica supervisor is invoked and the supervisor ensures that the effect of the intercepted call is the same regardless of whether the primary or backup performs the operation. When the primary supervisor intercepts a call by the primary replica, the primary supervisor makes the call to the operating system on behalf of the replica and then delivers the results of the operating system call (the "values returned by the operating system") to the primary replica. In other words, the primary supervisor causes a transformation in the state of the primary replica that is equivalent to the transformation the operating system would have caused if the call had not been intercepted.

The primary supervisor also sends a message to the backup replica. The message contains the values returned by the operating system. When the backup supervisor intercepts a call to the operating system by the backup replica, the backup supervisor does not call the operating system on behalf of the backup replica. Instead, the backup supervisor uses the values sent by the primary supervisor, as a result of the corresponding call by the primary replica, to transform the state of the backup replica. Thus, the replica supervisors ensure that the primary and backup replicas undergo equivalent transformations of their application state as a result of corresponding calls to the operating system.

Preferably, the invention uses a technique, commonly known as "object-code editing," to enable the replica supervisors to intercept calls to the operating system. An object-code editor examines an application's executable file, locates calls to the operating system and then replaces those calls with one or more instructions (an "instruction sequence") that, when executed by a processor, cause the processor to transfer control to the replica supervisor. Thus, the replica supervisor receives control when the replica calls the operating system. Advantageously, the invention can replace only calls to the operating system that can effect the environment or that can cause different transformations of the application state in different replicas. This selective replacement provides improved performance over the prior art because the replica supervisor is invoked only when necessary. Furthermore, unlike prior-art systems, a processor can execute a mixture of replicated and non-replicated applications, so a user can choose which applications to replicate and avoid overhead associated with replicating non-critical applications.

Alternatively, the invention replaces or modifies an existing component that provides an interface between applications and the operating system. For example, applications call the Windows NT operating system through an interface provided by a dynamic-linked library (DLL), specifically Win32. The DLL, in turn, transfers control to the operating system. In such a case, the invention replaces the DLL with one that transfers control to the replica supervisor instead. Other operating systems, such as the VMS operating system, have a well-known, invariant location (a "system service vector") for each possible call to the operating system. Applications call these locations, which contain instructions that transfer to an appropriate routine within the operating system. In such a case, the invention modifies these locations to transfer to the replica supervisor instead.

The replica supervisors "virtualize" certain operating system data, such as a processor's network address, that might otherwise be returned differently to different replicas. The replica supervisors return virtualized data to the replicas and to the environment. Once returned by the operating system on the primary processor, some data, such as time-of-day, can be used to satisfy the corresponding call by the backup replica despite the fact that clocks on different processors are never perfectly synchronized. After a failure of the primary processor and a take-over by the backup processor (a "fail-over"), the clock on the backup ("newly-promoted primary") processor might require adjustment to make it consistent with values that were returned to the newly-promoted primary replica before it was promoted. Alternatively, the newly-promoted primary supervisor can increase or decrease, as appropriate, all times passed between the newly-promoted primary replica and the newly-promoted primary processor to account for the difference between the two clocks.

Other operating system data, such as a processor's network address, cannot be changed, so the replica supervisors fabricate a network address and supply it to both the primary and backup replicas. The replica supervisors perform any necessary translations between the fabricated and actual network addresses when they handle calls to the operating system and values returned to the replicas. After a fail-over, the newly-promoted primary replica continues to use the same fabricated network address. The replica supervisors thus create a "virtual process environment" that is independent of the primary processor and that remains invariant, even after a fail-over.

The replica supervisors also ensure that, as a result of asynchronous events, the same changes in application state occur at the same relative points in the execution of each replica. As with calls to the operating system, the replica supervisors also virtualize operating system data that might otherwise be delivered differently to different replicas. The primary supervisor intercepts asynchronous events, and their attendant state-transforming values, that the operating system attempts to deliver to the primary replica. The primary supervisor subsequently delivers the results of the asynchronous event (the "values provided by the operating system") to the primary replica. In other words, the primary supervisor causes a transformation in the state of the primary replica that is equivalent to the transformation the operating system would have caused if the asynchronous event had not been intercepted. The primary supervisor also sends a message to the backup replica. The message contains the values provided by the operating system.

The backup supervisor intercepts and discards asynchronous events the operating system attempts to deliver to the backup replica. Instead, the backup supervisor uses the values sent by the primary supervisor, as a result of the corresponding asynchronous event delivered to the primary replica, to transform the state of the backup replica.

We define an "application-relative time" that advances as the application executes. The replica supervisors ensure that each asynchronous event is delivered to the replicas at the same application-relative time, i.e. at the same point in the dynamic instruction stream of each replica. Preferably, the invention uses object-code editing to locate loops in the application and to insert into each loop an instruction sequence that counts a number of times the processor executes each loop ("loop cycles") and transfers control to the replica supervisor every time the processor executes the loop a controllable number of times. (Locating instructions and inserting instructions in an application is commonly known as "instrumenting" the application.) Thus, the replica supervisor receives control periodically throughout the execution of the replica. The supervisor counts the number of times each loop executes and this count forms at least part of the application-relative time.

The primary supervisor notes the application-relative time at which it delivers each asynchronous event to the primary replica and it sends this time to the backup replica along with the state-transforming values associated with the asynchronous event. The backup supervisor waits until the backup replica reaches the same application-relative time before delivering the asynchronous event to the backup replica. This ensures that the backup replica has executed the same instructions as the primary replica before delivery of the asynchronous event. Of course, if the backup replica has already reached the same application-relative time, no wait is necessary.

The description thus far has been limited to "single-threaded" applications. A "thread" is an execution of a sequence of instructions by a processor. Each thread is scheduled separately by the operating system. A "process" includes an address space, an identity by which the process is known by other processes, and other operating system-specific quantities, such as privileges, e.g. exclusive access to an I/O device. One process can compromise multiple threads. Since the threads of a process share one address space, they must use a synchronization technique, e.g. a critical section, mutual exclusion semaphore or test-and-branch instruction, to coordinate access to the shared address space. These techniques enable at most one thread at a time to acquire and then release access to a shared resource, e.g. a location in the shared address space.

The invention can optionally be extended to provide fault-tolerance to threaded applications. The replica supervisors intercept acquisitions and releases of the shared resources by the threads and ensure that the sequence of acquisitions and releases is the same on the primary and backup replicas. The replica supervisors maintain an application-relative time for each thread, i.e. each replica supervisor maintains the count of loop cycles in thread-specific storage. Similar to the manner in which the replica supervisors handle calls to the operating system, the primary supervisor intercepts acquisitions and releases and sends to the backup supervisor an identity of the thread, an identity of the shared resource and the thread-specific application-relative time of the acquisition or release. The backup supervisor subsequently allows the threads on the backup replica to acquire and release the corresponding shared resources on the backup replica in the same order as they were acquired and released on the primary replica.

Preferably, the invention uses object-code editing to locate acquisitions and releases of the shared resources. Optionally, as with calls to the operating system, the invention can intercept only acquisitions and releases that can effect the environment or that can cause different transformations of the application state in different replicas. Furthermore, if the operating system provides acquisition and release functionality through calls to the operating system, fault-tolerant support for threads can be provided by the same mechanism that provides fault-tolerant support for calls to the operating system.

BRIEF DESCRIPTION OF THE DRAWINGS

The above and further advantages of the invention may be better understood by referring to the following description in conjunction with the accompanying drawings, in which:

FIG. 1 is a block diagram of a computer system showing it's layers;

FIG. 2 is a more detailed block diagram of a portion of the computer system of FIG. 1;

DESCRIPTION OF THE PREFERRED EMBODIMENT

Figure 3:
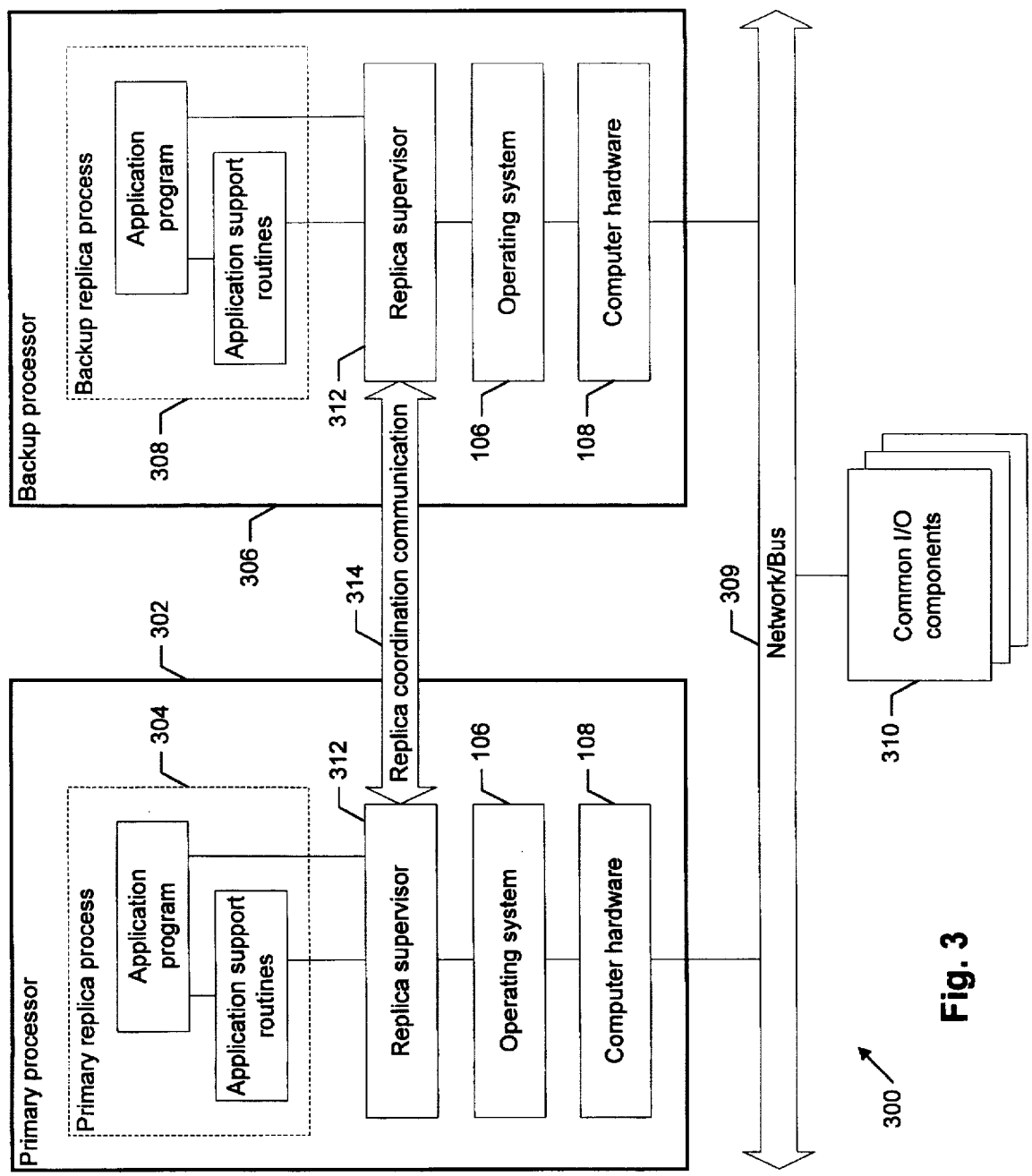
FIG. 3 is a block diagram of a fault-tolerant computer system, having a primary and a backup processor, according to the present invention.

FIG. 1 shows a computer system 100 and its constituent layers, namely an application program 102, application support routines 104, operating system software 106, computer hardware 108, and I/O components 110. The invention interposes a replica supervisor (not shown) between the operating system software 106 and the application program 102/application support routines 104. As illustrated in FIG. 2, an application 202 comprises an application program 102 and application support routines 104. The application program 102 makes operating system calls 204, either directly or through the application support routines 104, to the operating system 106. As a result of the operating system calls 204, the operating system 106 interacts with the environment, including I/O devices, and returns results and asynchronous system events 206 to the application 202.

FIG. 3 is a block diagram of a fault-tolerant computer system 300 according to the invention in which a primary processor 302 executes a primary replica 304 and a backup processor 306 executes a backup replica 308. A network and/or processor interconnect bus 309 interconnects the primary and backup processors 302 and 306 with common I/O components 310. A replica supervisor 312 is interposed between the primary replica 304 and the operating system 106 on the primary processor 302. Similarly, a replica supervisor 312 is interposed between the backup replica 308 and the operating system 106 on the backup processor 306. The replica supervisors 312 intercept calls to the operating system made by the primary and backup replicas 304 and 308 and asynchronous events delivered by the operating system 106 to the replicas.

The replica supervisors 312 communicate with each other over a replica coordination communication means 314 to coordinate the primary and backup replicas 304 and 308. The replica coordination communication 314 can be carried over the network and/or processor interconnect bus 309, over a separate bus or network, or over any other message passing mechanism. The replica coordination communication 314 between the replica supervisors 312 provides first-in-first-out (FIFO) message delivery, though not necessarily reliable message delivery. The invention defines a protocol between the replica supervisors 312. This protocol is manifested in messages passed between the replica supervisors 312 over the replica coordination communication means 314.

Application-relative time advances for each replica 304 and 308 as each processor 302 and 306, respectively, executes the replica. Preferably, an object-code editor locates back-branch instructions in a file that stores the application program's executable module. Back-branch instructions include conditional and unconditional branch instructions that, when executed by a processor, cause the processor to transfer control to an instruction whose address is lower than the address of the branch instruction, i.e. back-branch instructions implement loops. A replica's application-relative time includes an offset "i" that is incremented each time the processor executes one cycle of one of the loops. Execution of each replica 304 and 308 is partitioned into epochs "e" of application-relative time, where each epoch comprises one or more increments of the replica's offset i. Corresponding epochs in the primary and backup replicas 304 and 308 comprise equivalent instruction sequences. Each replica's offset i is reset to zero at the beginning of each epoch. Thus, for each replica 304 and 308, its application-relative time comprises an epoch and an offset from the beginning of the epoch, hereinafter represented as <e,i>.

Preferably, the object-code editor inserts, prior to each back-branch instruction, i.e. into each loop, an instruction sequence that counts a number of times the loop executes, i.e. the offset i. The instruction sequence transfers control to the replica supervisor 312 whenever the loop executes a maximum number of times. We define an epoch as the maximum number of times a loop can execute. Thus, the replica supervisor 312 receives control periodically throughout the execution of the replica, i.e. at the end of each epoch. The replica supervisor can control the frequency with which it receives control, i.e. the epoch length, by changing the maximum number of times the loop can execute. Advantageously, the epoch length can be increased to reduce the frequency with which the replica supervisor 312 is invoked and, therefore, reduce overhead imposed by the replica supervisor. Alternatively, decreasing the epoch length decreases response time of the replica supervisor 312 in delivering asynchronous events to the replicas 304 and 308.

Figure 4:
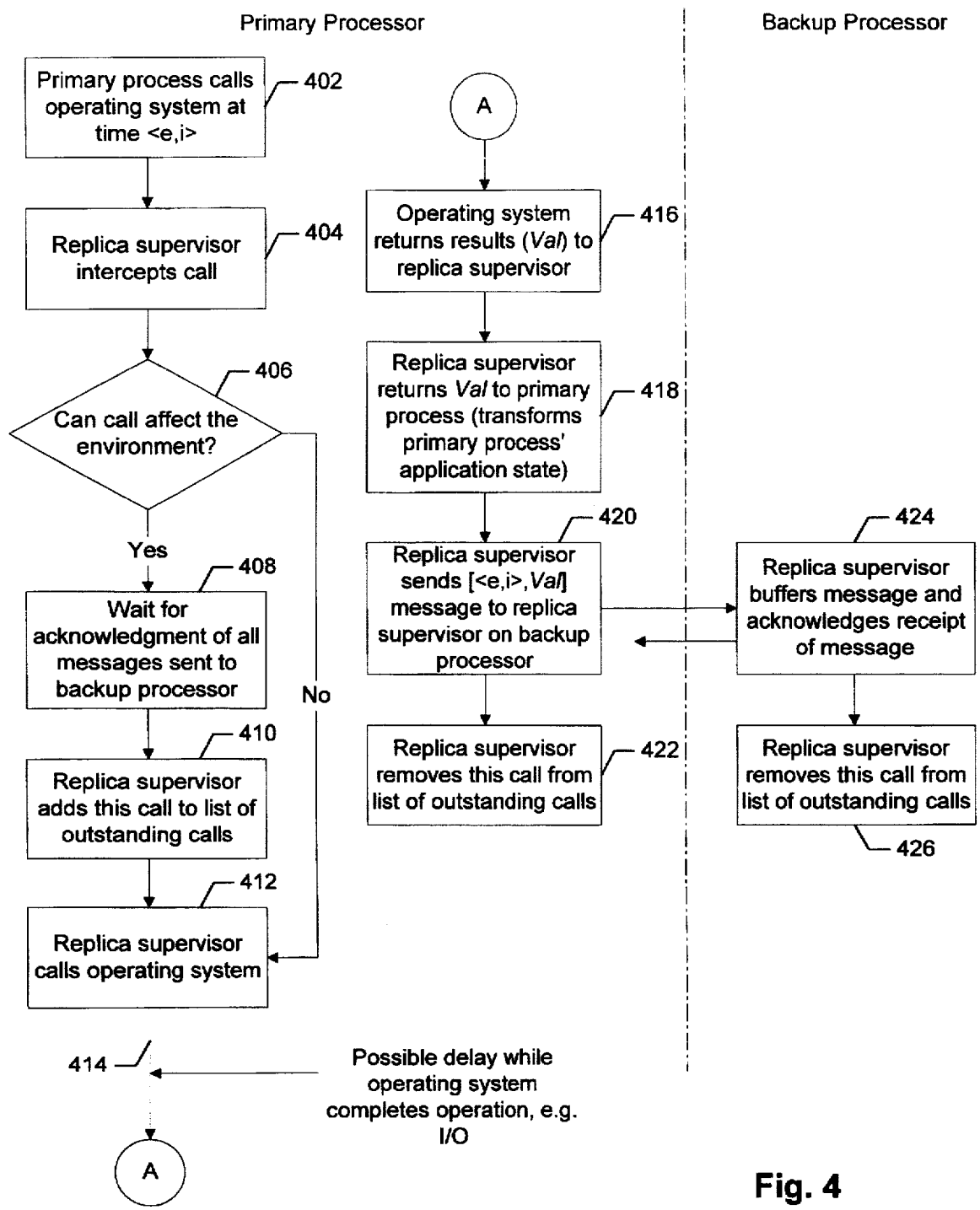
FIG. 4 is a flow chart illustrating steps taken by the primary processor of FIG. 3 for processing calls to an operating system.

FIG. 4 is a flowchart illustrating steps taken by the primary and backup processors 302 and 306 for processing calls made by the replicas 304 and 308 to the operating system 106. At step 402 the primary replica 304 calls the operating system at application-relative time <e,i>. At step 404 the replica supervisor 312 on the primary processor 302 intercepts the call to the operating system. At step 406 the replica supervisor 312 ascertains whether the call can affect the environment, e.g. a call to one of the common I/O components 310. If the call can affect the environment, at step 408 the replica supervisor 312 waits for acknowledgment of all messages previously sent to the replica supervisor 312 on the backup processor 306 over the replica coordination communication means 314. At step 410 the replica supervisor 312 adds this call to its list of outstanding calls to the operating system that can affect the environment. At step 412 the replica supervisor 312 calls the operating system 106 on behalf of the primary replica 304. If necessary, the replica supervisor 312 virtualizes operating system data. A delay might occur at step 414 while the operating system 106 completes an operation, e.g. an I/O operation. At step 416 the operating system returns values to the replica supervisor 312 as a result of the call to the operating system. At step 418 the replica supervisor 312 returns the values to the primary replica 304, i.e. the supervisor causes a transformation in the state of the primary replica that is equivalent to the transformation the operating system 106 would have caused if the call had not been intercepted. At step 420 the replica supervisor 312 sends a message over the replica coordination communication means 314 to the replica supervisor on the backup processor 306. The message contains the application-relative time, i.e. <e,i>, and the state-transforming values returned by the operating system 106 as a result of the call. At step 422 the replica supervisor 312 removes this call from the list of outstanding calls that can affect the environment. Optionally, the messages for multiple calls to the operating system can be sent together as a single message.

At step 424 the replica supervisor 312 on the backup processor 306 receives the message sent by the replica supervisor on the primary processor 302 at step 420. The replica supervisor 312 on the backup processor 306 buffers the message and acknowledges receipt of it. At step 426 the replica supervisor 312 on the backup processor 306 removes a corresponding call from its list of outstanding calls that can affect the environment.

Figure 5:
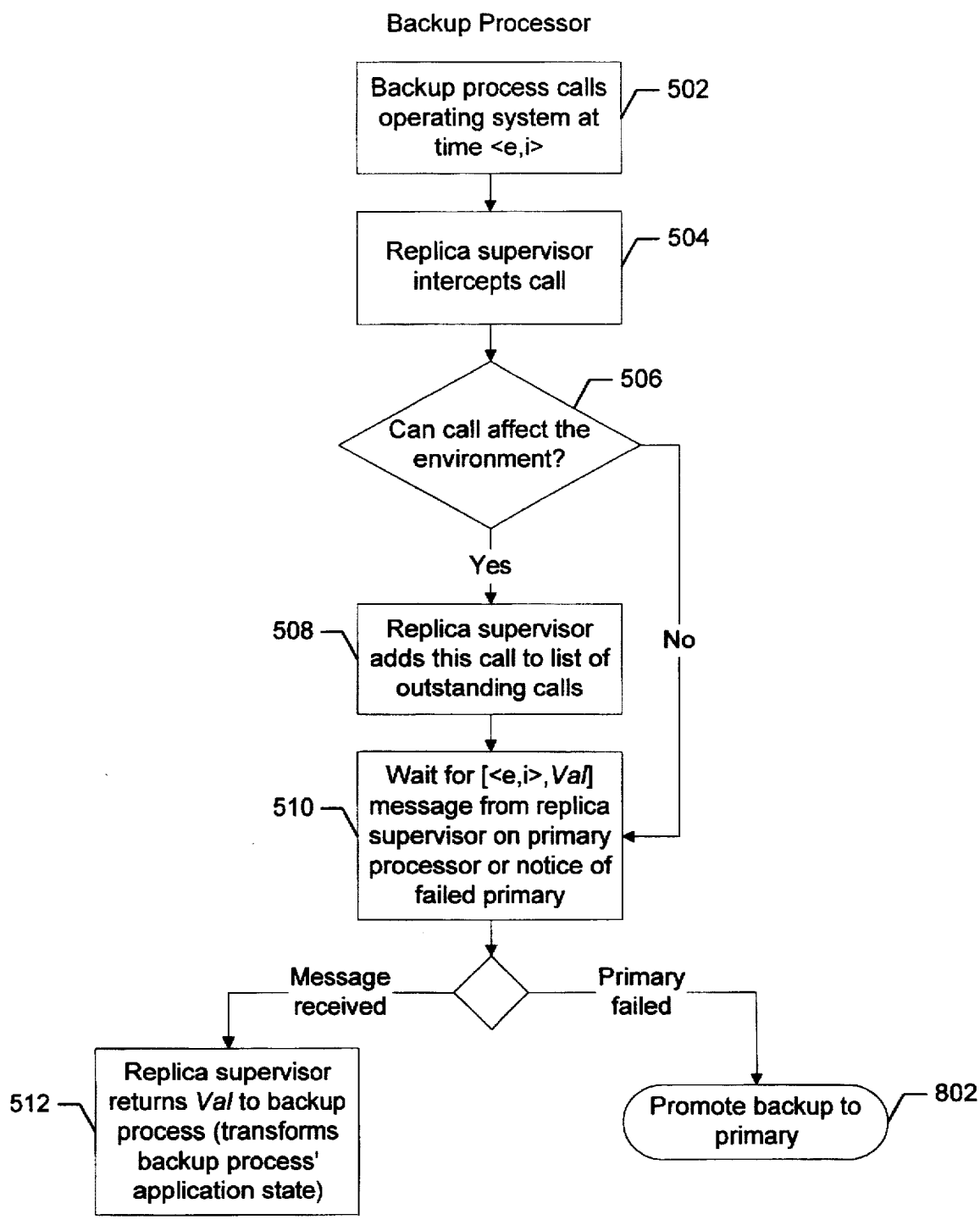
FIG. 5 is a flow chart illustrating steps taken by the backup processor of FIG. 3 for processing calls to the operating system.

FIG. 5 is a flowchart illustrating steps taken by the replica supervisor 312 on the backup processor 306 for processing calls to the operating system 106 by the backup replica 308. At step 502 the backup replica 308 calls the operating system at application-relative time <e,i>. At step 504 the replica supervisor 312 on the backup processor 306 intercepts the call. At step 506 the replica supervisor 312 ascertains whether the call can affect the environment. If the call can affect the environment, at step 508 the replica supervisor 312 on the backup processor 306 adds the call to its list of outstanding calls that can affect the environment. At step 510 the replica supervisor 312 on the backup processor 306 waits for the message that the replica supervisor 312 on the primary processor 302 sends at step 420 (FIG. 4). In other words, the replica supervisor 312 on the backup processor 306 waits for a message that corresponds to the call to the operating system made by the backup replica 308 at step 502. The replica supervisor 312 identifies the message of the corresponding call to the operating system by matching the application-relative time <e,i> at which the backup replica 308 called the operating system and the application-relative time at which the primary replica 304 called the operating system. If the message is received, at step 512 the replica supervisor 312 on the backup processor 306 returns to the backup replica 308 the state-transforming values sent by the replica supervisor 312 on the primary processor 302 at step 420 (FIG. 4). In other words, the replica supervisor 312 on the backup processor 306 transforms the state of the backup replica 308, the transformation being equivalent to the transformation of the primary replica 304 at step 418 (FIG. 4). On the other hand, if the replica supervisor 312 on the backup processor 306 fails to receive the message or receives notification of a failure of the primary processor 302, at step 514 the replica supervisor 312 transfers to linkage point 802, at which the backup processor is promoted to the primary processor.

Figure 6:
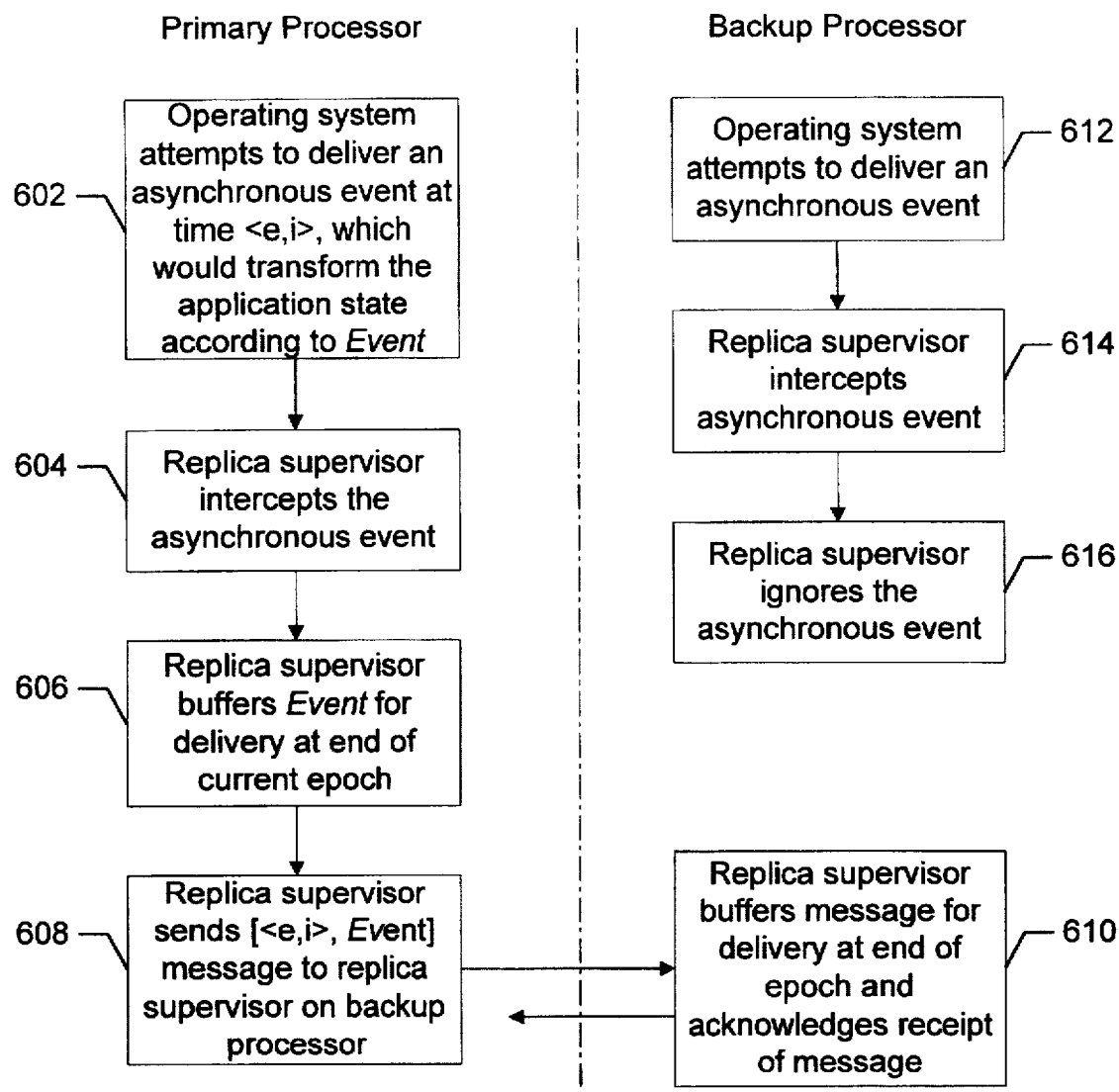
FIG. 6 is a flow chart showing steps taken by the fault-tolerant system of FIG. 3 for processing asynchronous events.

FIG. 6 is a flowchart showing steps taken by the replica supervisors 312 on the primary and backup processors 302 and 306 for processing asynchronous events. At step 602 the operating system 106 attempts to deliver an asynchronous event at application-relative time <e,i> to the primary replica 304. At step 604 the replica supervisor 312 intercepts the asynchronous event and at step 606 the replica supervisor buffers the event and the state-transforming values provided by the operating system. If necessary, the replica supervisor 312 virtualizes operating system data. At step 608 the replica supervisor 312 sends a message over the replica coordination communication means 314 to the replica supervisor on the backup processor 306. The message contains the application-relative time of the asynchronous event and the state-transforming values provided by the operating system. At step 610 the replica supervisor 312 on the backup processor 306 receives the message, buffers it and acknowledges receipt of it. Optionally, the messages for multiple asynchronous events can be sent together as a single message.

At step 612 the operating system 106 on the backup processor 306 attempts to deliver an asynchronous event to the backup replica 308. At step 614, the replica supervisor 312 on the backup processor 306 intercepts the asynchronous event and at step 616 the replica supervisor ignores the asynchronous event.

Figure 7:
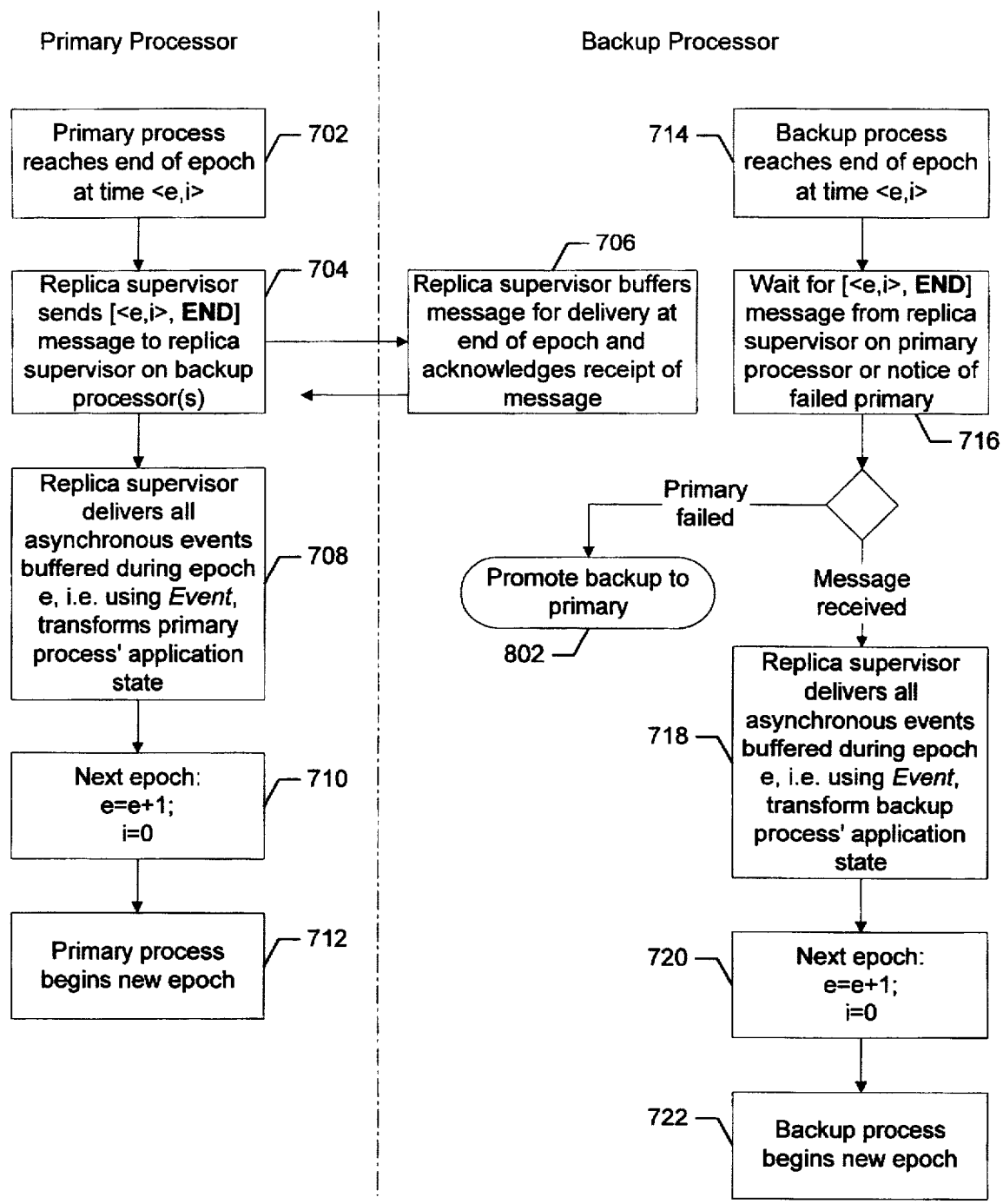
FIG. 7 is a flow chart showing steps taken by the fault-tolerant system of FIG. 3 at the end of an epoch (a unit of application-relative time)

FIG. 7 is a flowchart showing steps taken by the replica supervisors 312 on the primary and backup processors 302 and 306 at the end of each epoch. At step 702 the primary replica 304 reaches the end of an epoch at application-relative time <e,i>. At step 704 the replica supervisor 312 sends an end-of-epoch message over the replica coordination communication means 314 to the replica supervisor 312 on the backup processor 306. At step 706 the replica supervisor 312 on the backup processor 306 receives the message, buffers it, and acknowledges receipt of the message. At step 708 the replica supervisor 312 on the primary processor 302 delivers all asynchronous events buffered during the epoch. In other words, the replica supervisor 312 causes a transformation in the state of the primary replica 304 that is equivalent to the transformation the operating system would have caused if the asynchronous event had not been intercepted. At step 710 the replica supervisor 312 increments e and sets i to zero to begin a new epoch. At step 712 the primary replica 304 begins the new epoch.

At step 714 the backup replica 308 reaches the end of an epoch at time <e,i>. At step 716 the replica supervisor 312 waits for the end-of-epoch message that the replica supervisor 312 on the primary processor 302 sends at step 704. If the message is received, at step 718 the replica supervisor 312 on the backup processor 306 delivers all asynchronous events buffered during the epoch. At step 720 the replica supervisor increments e and sets i to zero and at step 722 the backup replica 308 begins a new epoch.

On the other hand, if the replica supervisor 312 on the backup processor 306 fails to receive the end-of-epoch message sent in step 704 or receives notification that the primary processor 302 failed, at step 724 the replica supervisor 312 transfers to linkage point 802, at which the backup processor is promoted to the primary processor.

Figure 8:
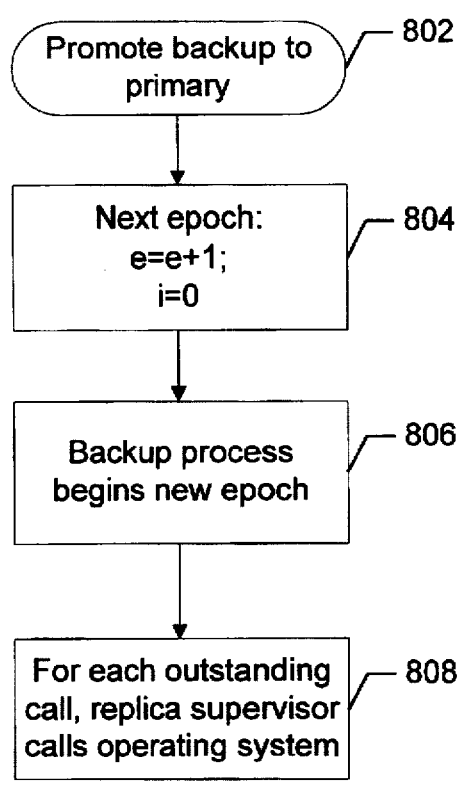
FIG. 8 is a flow chart showing steps taken by the fault-tolerant system of FIG. 3 after a failure of the primary processor.

FIG. 8 is a flowchart showing steps taken by the backup processor 306 after a failure of the primary processor 302. At step 804 the replica supervisor 312 increments e and sets i to zero and at step 806 the backup replica 308 begins a new epoch.

After a failure, it is impossible for the replica supervisor 312 on the backup processor 306 to ascertain exactly which requests that effect the environment, e.g., I/O requests to the common I/O components 310, had been successfully completed by the primary processor 302. As previously described, operating system calls that can effect the environment are added to a list of such calls at step 508 (FIG. 5). Such requests completed on the primary processor 302 cause the replica supervisor 312 on the primary processor 304 to send a message at step 420 (FIG. 4) to the replica supervisor 312 on the backup processor 306. However, the replica coordination communication means 314 is not necessarily reliable and the message might not be received. Consequently, the replica supervisor 312 on the backup processor 304 might not remove the corresponding call from its list at step 426. Thus, all calls removed from the list in step 426 have been completed by the primary processor 302, but calls remaining on the list might or might not have been completed by the primary processor.

Each outstanding call on the list falls into one of three categories. Calls in the first category are "idempotent", i.e., each call contains all information necessary for performing the operation and they can be repeated with impunity. For example, in a disk I/O request the address of the data on the disk, the address of the data in memory, the size and the transfer direction (read/write) are all included in the call. Performing such an I/O operation a second time does not introduce any errors. After a fail-over, for these types of calls, the replica supervisor 312 on the backup processor 304 simply repeats the operation at step 808 (FIG. 8).

The second category of outstanding calls is non-idempotent, but the designer of the fault-tolerant system also controls the design of the common I/O component. In this case sequence numbers or another mechanism can be used by the replica supervisor to enable the I/O devise to ignore duplicate requests. Here again, the replica supervisor 312 on the backup processor 308 simply retries the operation at step 808.

Otherwise, in the third category of outstanding calls, the replica supervisor 312 on the backup processor 306 returns an unsuccessful I/O operation status code to the replica 308. The replica 308 should already be written to handle such return codes, i.e., the replica handles the event as a transient I/O device error.

After a failure, the fault-tolerant computer system 300 can optionally restart the failed processor and synchronize the application state of its replica with that of the surviving replica. The replica supervisor on the surviving processor sends messages to the replica supervisor on the restarted processor, the messages containing the application state of the surviving replica, possibly including the contents of all or part of the replica's address space, registers, etc. The replica supervisor on the restarted processor then sets the application state, including the contents of the address space, registers, etc., of the restarted replica.

Other embodiments and modifications are possible. For example, a source-code editor can be used instead of an object-code editor. Alternatively, the object code can be edited at load time by a loader. Advantageously, load-time editing provides fault-tolerance to applications that dynamically load executable modules. For example, as a result of user commands an application might dynamically link in a DLL or might use object linking and embedding (OLE) to cause the processor to execute another module. Load-time editing provides fault tolerance for such dynamically linked modules.

Replica management can also be used with non-fault-tolerant applications. For example, replicas of a database can be stored in multiple locations on a network. A replica supervisor can then intercept I/O requests from client or middle-tier, in a three-tiered architecture, applications to the database and direct the requests to the nearest or fastest-responding replica of the database. In such a case, the application need not be written with the knowledge that the database is replicated, yet the application receives a performance benefit by accessing the nearest replica. Furthermore, all access requests from all concurrently executing applications are distributed among all the replicas of the database, so no single database is a bottleneck.

It will therefore be seen that we have developed a transparent fault-tolerant computer system, which can be utilized with a variety of computer applications. The terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. In a fault-tolerant computer system having a primary processor and a backup processor, a method for executing a primary replica of a program (primary replica) on the primary processor and a backup replica of the program (backup replica) on the backup processor, the primary processor including a primary replica supervisor interposed between the primary replica and a primary operating system, the backup processor including a backup replica supervisor interposed between the backup replica and a backup operating system, each replica having a process state, the method comprising the steps of:

at the primary replica supervisor, intercepting an asynchronous event provided by the primary operating system in response to a system call issued the primary replica;

delivering the asynchronous event to the primary replica at an application-relative time that advances as the replica executes independent of the system call to the primary operating system, the asynchronous event causing a process state change at the primary replica (primary state change);

sending the intercepted asynchronous event to the backup replica supervisor over a replica coordination communication medium coupling the primary and backup replica supervisors; and delivering the intercepted asynchronous event to the backup replica at the application-relative time, the intercepted asynchronous event causing a process state change at the backup replica (backup state change) such that if the primary processor fails, the backup state change is equivalent to the primary state change as of the application-relative time.

2. The method of claim 1 further comprising the step of partitioning execution of the replicas into epochs, each of which contains at least one logical time offset.

3. The method of claim 2 wherein the application-relative time comprises an epoch and a logical time offset from the beginning of the epoch and wherein the step of partitioning comprises the steps of:

instrumenting the replicas to advance the logical time offset; and transferring control to the replica supervisors at a boundary of the epoch.

4. In a fault-tolerant computer system having a primary processor and a backup processor, a method for executing a primary replica of a program (primary replica) on the primary processor and a backup replica of the program (backup replica) on the backup processor, the primary processor including a primary replica supervisor interposed between the primary replica and a primary operating system, the backup processor including a backup replica supervisor interposed between the backup replica and a backup operating system, each replica having a plurality of threads, the method comprising the steps of:

executing each thread of the primary replica to perform acquisitions and releases of exclusive accesses to shared resources (primary acquisitions and releases);

at the primary replica supervisor, (i) intercepting the primary acquisitions and releases to identify the thread executed by the primary replica and the shared resources accessed by the primary replica and (ii) permitting performance of the primary acquisitions and releases of the shared resources;

sending identities of the executed thread and accessed shared resources to the backup replica supervisor over a replica coordination communication medium coupling the primary and backup replica supervisors;

executing each thread of the backup replica to perform acquisitions and releases of exclusive accesses to shared resources (backup acquisitions and releases);

at the backup replica supervisor, (i) intercepting the backup acquisitions and releases and (ii) permitting performance of those backup acquisitions and releases to shared resources that correspond to the identified executed thread and accessed shared resources of the primary replica, such that if the primary processor fails, the backup acquisitions and releases are equivalent to the primary acquisitions and releases as of a time prior to the failure.

* * * * *